US008035478B2

(12) United States Patent
Lee

(10) Patent No.: US 8,035,478 B2
(45) Date of Patent: Oct. 11, 2011

(54) EASY-TO RETROFIT, ELECTRONICALLY CONTROLLED DOOR LOCK SYSTEM

(75) Inventor: Yong-Jong Lee, Seoul (KR)

(73) Assignee: Irevo, Inc. (KR)

( * ) Notice: Subject to any disclaimer, the term of this patent is extended or adjusted under 35 U.S.C. 154(b) by 1339 days.

(21) Appl. No.: 10/592,846

(22) PCT Filed: Mar. 16, 2005

(86) PCT No.: PCT/KR2005/000756

§ 371 (c)(1),
(2), (4) Date: Sep. 14, 2006

(87) PCT Pub. No.: WO2006/001572

PCT Pub. Date: Jan. 5, 2006

(65) Prior Publication Data

US 2007/0204663 A1 Sep. 6, 2007

(30) Foreign Application Priority Data

Mar. 16, 2004 (KR) ........................ 10-2004 0017568

(51) Int. Cl.
*G06F 7/00* (2006.01)

(52) U.S. Cl. ............ 340/5.7; 340/5.1; 340/5.2; 340/3.1; 340/426.28; 340/542; 70/271; 70/163

(58) Field of Classification Search .................. 340/5.7, 340/5.2, 5.1, 825, 426.28, 542, 572.9; 70/271, 70/163, 277, 280–282
See application file for complete search history.

(56) References Cited

U.S. PATENT DOCUMENTS

| | | | | | |
|---|---|---|---|---|---|
| 3,777,306 | A * | 12/1973 | Speickhoff | .................. | 307/10.5 |
| 3,812,403 | A * | 5/1974 | Gartner | ......................... | 340/5.54 |
| 5,477,213 | A * | 12/1995 | Atarashi | ......................... | 340/5.6 |
| 5,818,334 | A * | 10/1998 | Stanley | ......................... | 340/505 |
| 5,848,541 | A * | 12/1998 | Glick et al. | .................. | 70/278.3 |
| 6,038,457 | A * | 3/2000 | Barkat | ....................... | 455/556.1 |
| 6,331,812 | B1 * | 12/2001 | Dawalibi | ....................... | 340/5.2 |
| 7,170,998 | B2 * | 1/2007 | McLintock et al. | .......... | 380/277 |
| 7,463,132 | B2 * | 12/2008 | Deng et al. | ..................... | 340/5.2 |
| 2002/0099945 | A1 * | 7/2002 | McLintock et al. | .......... | 713/186 |

(Continued)

FOREIGN PATENT DOCUMENTS

EP 0597373 A 5/1994

(Continued)

OTHER PUBLICATIONS

International Search Report for PCT/KR2005/000756, ISA/KR, Daejeon, Korea, Jun. 30, 2005.

*Primary Examiner* — Daniel Wu
*Assistant Examiner* — Ryan Sherwin
(74) *Attorney, Agent, or Firm* — Harness, Dickey & Pierce, P.L.C.

(57) ABSTRACT

Disclosed is an easy-to-retrofit, electronically controlled door lock system designed to change or expand functions of a door lock without having to replace the door lock as a whole. The door lock system includes a door lock 100 for locking and unlocking a door in response to an input signal from a key means, the door lock having predetermined inherent functions, and a function expanding device 200 having additional functions other than the predetermined inherent functions of the door lock, the function expanding device being replaceably attached to the door lock.

19 Claims, 4 Drawing Sheets

U.S. PATENT DOCUMENTS

| | | | | |
|---|---|---|---|---|
| 2003/0045278 | A1 | 3/2003 | Kizu et al. | |
| 2004/0123113 | A1 * | 6/2004 | Mathiassen et al. | 713/185 |
| 2004/0139177 | A1 * | 7/2004 | Yook | 709/220 |

FOREIGN PATENT DOCUMENTS

| | | | | |
|---|---|---|---|---|
| JP | 05-33536 | A | | 2/1993 |
| JP | 06-146674 | A | | 5/1994 |
| JP | 2001262913 | A | * | 9/2001 |
| JP | 2003-76436 | A | | 3/2003 |
| WO | WO 0065770 | A1 | * | 11/2000 |
| WO | WO 0237428 | A1 | * | 5/2002 |
| WO | WO 2004020768 | A1 | * | 3/2004 |

* cited by examiner

[Fig. 1]

[Fig. 3]
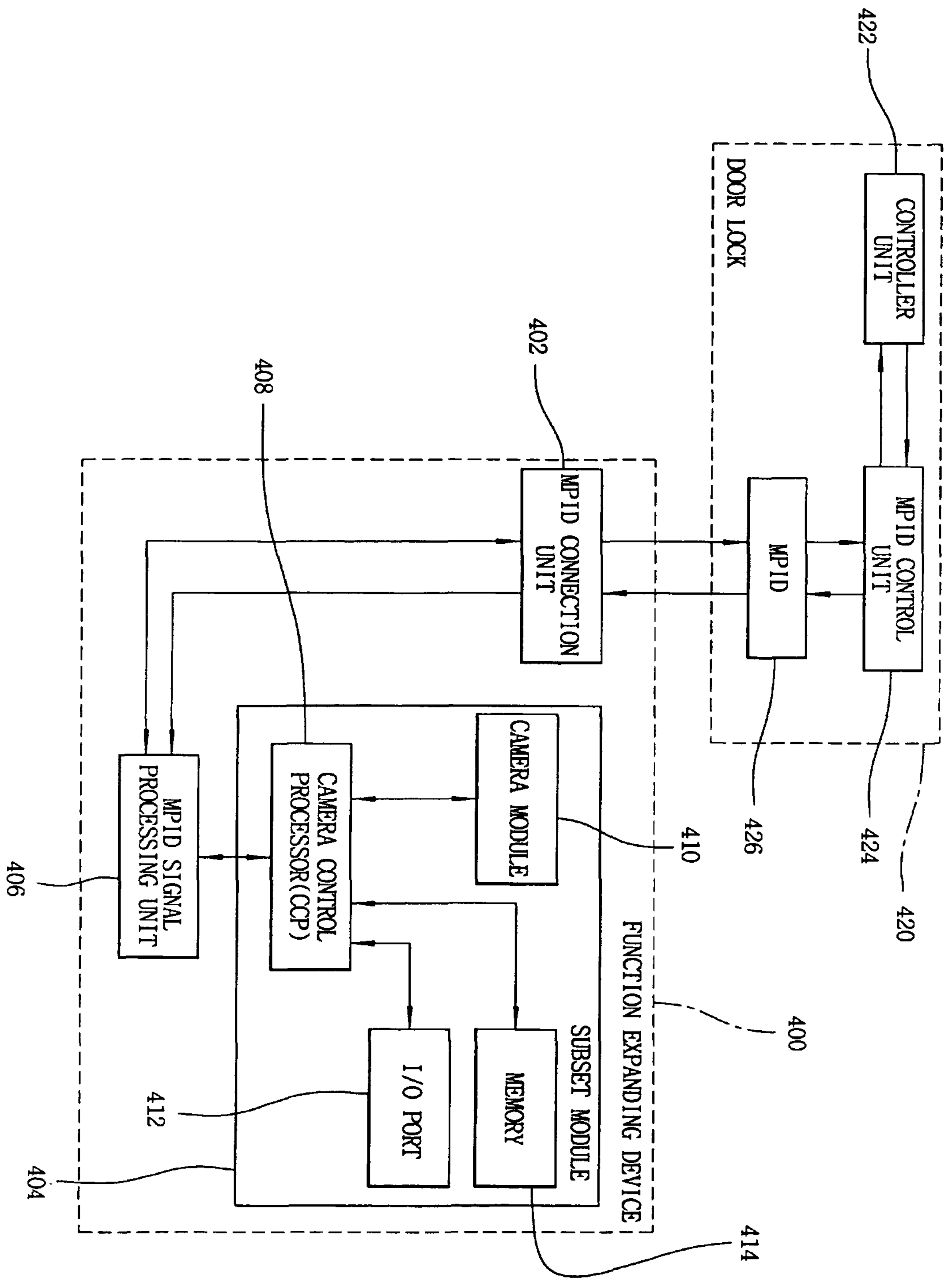

[Fig. 4]
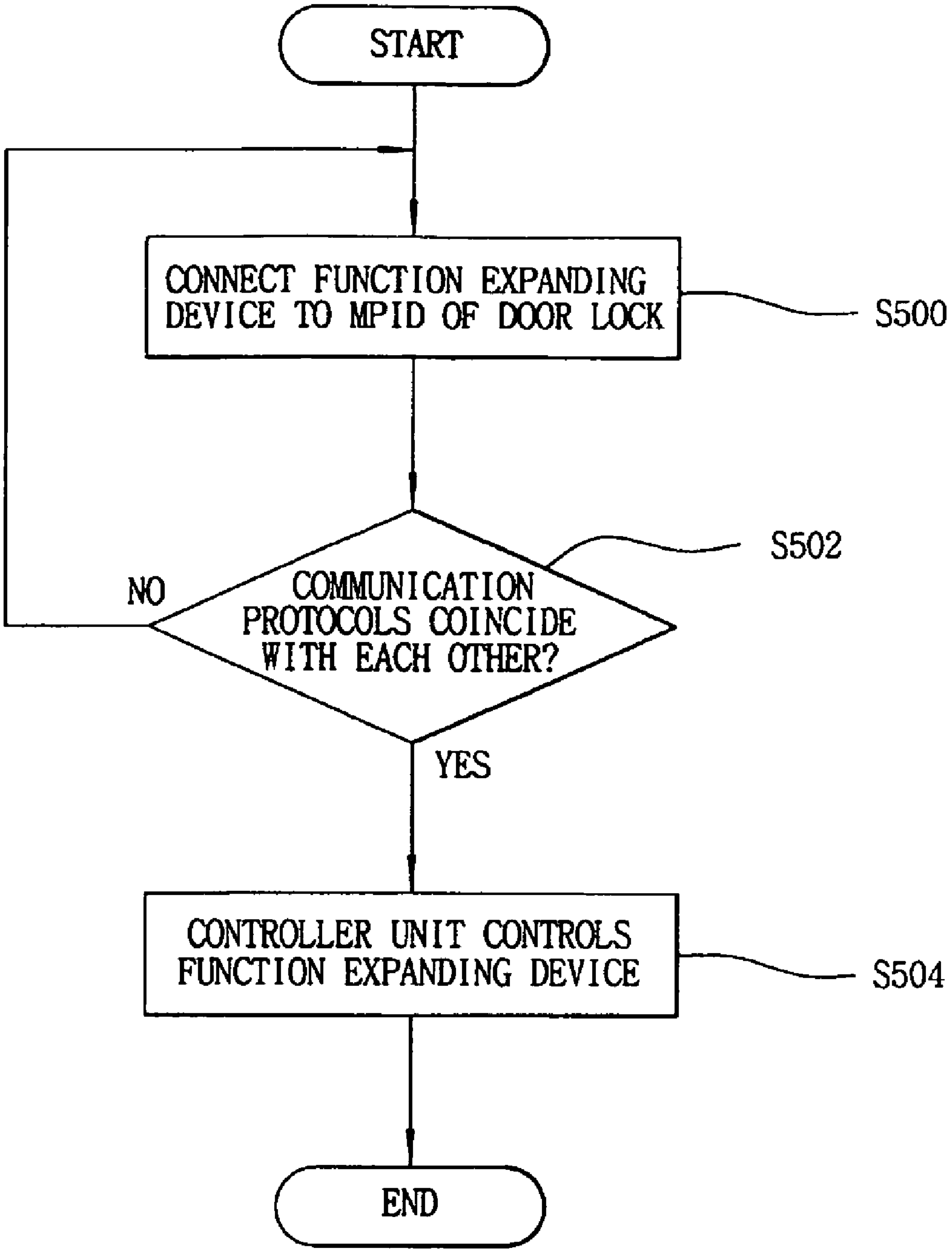

EASY-TO RETROFIT, ELECTRONICALLY CONTROLLED DOOR LOCK SYSTEM

TECHNICAL FIELD

The present invention relates to an electronically controlled door lock system, and more particularly to an easy-to-retrofit, electronically controlled door lock system that can easily retrofit a door lock as needed and thus improve the performance of the door lock by replaceably attaching a function expanding device having additional functions to the door lock with a predetermined inherent function.

BACKGROUND ART

Mechanical door locks for locking and unlocking a door with a metal key have mainly been used as door locking devices in an office, hotel, apartment, etc. However, the conventional mechanical door locks are poor in security because the metal key as a door locking and unlocking means is vulnerable to inadvertent loss and unwanted duplication. At present, in consideration of the vulnerability of the conventional mechanical door lock, use is made of a variety of door locks such as a door lock for locking and unlocking the door with a magnet card type or smart card type electronic key, a door lock for locking and unlocking the door by a key input of a secret number and so on. Moreover, active research and commercialization is conducted for door locks capable of locking and unlocking the door through a bio recognition of the inherent characteristic of a specified part of a human body such as a voice recognition, fingerprint recognition, face recognition, etc.

In the meantime, information communication technologies represented by the Internet and mobile communications have been changing the living patterns of the moderns. Specifically, Internet-feasible personal computers have been spread into almost all of the homes, schools and offices, allowing the user to acquire information using web sites, purchase goods through electronic transactions and exchange news through E-mails. Additionally, through the use of a mobile communication terminal, it has become to provide diversified services such as financial settlement, home automation, use of wireless Internet, etc., in addition to the voice call-oriented mobile communication service.

At an initial stage, the information communication technologies were separately developed depending on their purposes of use such as computers, mobile communications, broadcastings and the like. Nowadays, the technologies have a tendency to be developed in convergence. A representative example of the convergence of the information communication technologies may be a home network. Home electronic appliances begin to emerge that can interact with the Internet and/or mobile communications to thereby construct a home network. In other words, it was conventionally possible for a user to directly manipulate a TV receiver, a washing machine, etc. only inside the house, but at present, the user can control, even outside the house, various kinds of home electronic appliances such as a TV receiver, a washing machine, a lighting equipment and an oven through the use of a mobile communication terminal connected to the Internet.

Meanwhile, the conventional door locks are generally of a stand-alone type that can perform only the functions set by the hardware and software preliminarily equipped at their manufacturing process. This makes it impossible to expand the functions of the door lock unless the door lock itself is replaced as a whole, even if the user wishes to enjoy additional functions such as crime prevention, fire detection and home network.

DISCLOSURE OF INVENTION

Technical Problem

Accordingly, the present invention has been made to solve the above-mentioned problems inherent in the prior art, and it is an object of the present invention to provide an easy-to-retrofit, electronically controlled door lock system that allows the door lock in use to be retrofitted with ease and in a cost-effective manner to thereby add new functions, to the door lock, such as crime prevention, fingerprint authentication, fire detection and interaction with a home network, thus making it possible to change or expand the functions of the used door lock without having to replace the door lock as a whole.

Technical Solution

In order to accomplish the above-mentioned and other objects, an easy-to-retrofit, electronically controlled door lock system according to the present invention comprises a door lock 100 for locking and unlocking a door in response to an input signal from a key means, the door lock having predetermined inherent functions; and a function expanding device 200 having additional functions other than the predetermined inherent functions of the door lock and being replaceably attached to the door lock 100, wherein the door lock 100 comprises an authentication unit 102 for authenticating the key means of the door lock, a multi-purpose interface device 110 for separably connecting the function expanding device 200 to the door lock 100, a multi-purpose interface device control unit 112 for controlling a operation of the function expanding device 200, a controller unit 104 for controlling a whole operation of the door lock 100, and a driving unit 114 for causing the door lock to perform the locking and unlocking function under the control of the controller unit 104.

ADVANTAGEOUS EFFECTS

The door lock system according to the present invention makes it possible to change or expand the functions of the door lock by adding the functions desired by a user with ease and in a cost-effective manner, without having to replace the door lock in use.

BRIEF DESCRIPTION OF THE DRAWINGS

The above objects, other features and advantages of the present invention will become more apparent by describing the preferred embodiments thereof with reference to the accompanying drawings, in which:

FIG. 3 is a view illustrating the inventive door lock system provided with a function expanding device having a camera function; and FIG. 4 is a flowchart illustrating an initial process of mounting a new function expanding device to a door lock in the door lock system according to the present invention.

BEST MODE FOR CARRYING OUT THE INVENTION

Figure 1:
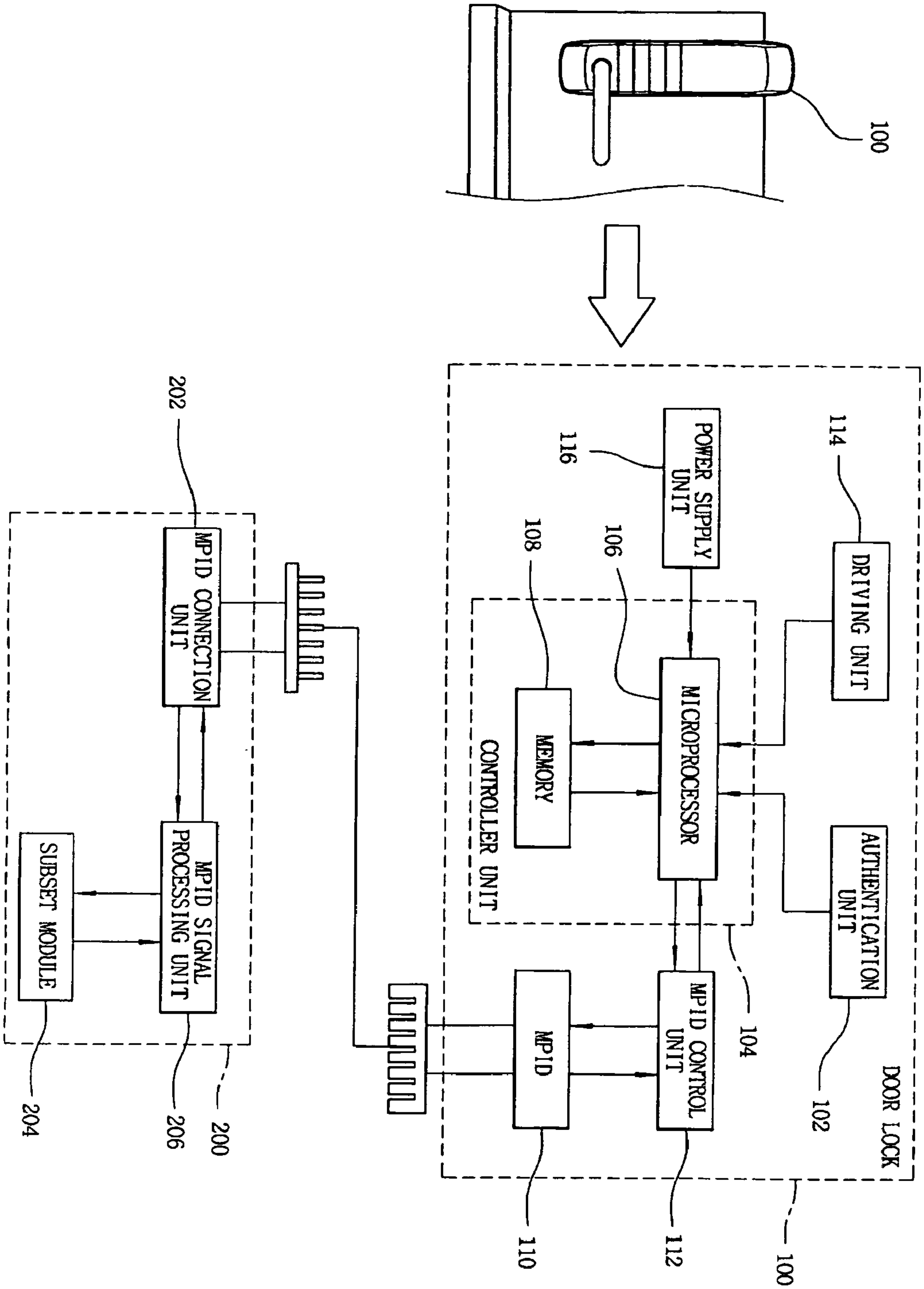
FIG. 1 is a block diagram illustrating the construction of an easy-to-retrofit, electronically controlled door lock system according to the present invention.

Now, an easy-to-retrofit, electronically controlled door lock system according to a preferred embodiment of the present invention will be described in detail with reference to the annexed drawings. In the following description of the present invention, the same drawing reference numerals are used for the same elements even in different drawings, the duplicate explanation of which will be omitted for simplicity.

Mode for the Invention

Referring to FIG. 1, the door lock system according to the present invention includes a door lock 100 for locking and unlocking a door according to an input signal from a key means and having predetermined inherent functions, and a function expanding device 200 having additional functions other than the predetermined inherent functions of the door lock 100 and replaceably attached to the door lock. The term "inherent function" herein means all functions inherently built in the door lock, including the locking and unlocking function. The "additional functions" will be explained later.

The door lock 100 includes an authentication unit 102, a controller unit 104, a multi-purpose interface device 110, a multi-purpose interface device control unit 112, a driving unit 114, and a power supply unit 116. In the drawings, the multi-purpose interface unit is denoted by "MPID".

The controller unit 104 is provided with a microprocessor 106 having serial and parallel ports, and a memory 108 that stores a program for driving the door lock 100, detection information of the key means and an authentication algorithm. Also, the controller unit 104 is connected to the authentication unit 102, the multi-purpose interface device 110, the multi-purpose interface device control unit 112, the driving unit 114 and the power supply unit 116, and is adapted to control the whole operation of the door lock 100 and the function expanding device 200. The term "key means" herein denotes all means capable of inputting signals required for the locking and unlocking of the door lock 100, and may include magnetic card type electronic keys, semiconductor stick keys, numeral buttons provided in the door lock 100, etc.

Additionally, the controller unit 104 is adapted to drive the authentication algorithm and determine whether the corresponding key means is proper by comparing the authentication information of the key means detected by the authentication unit 102 with the detection information stored in the memory 108. If the key means is proper, the controller unit 104 generates and transfers a door locking and unlocking signal to the driving unit 114. Also, the controller unit 104 controls the function expanding device 200 connected to the multi-purpose interface device through the multi-purpose interface device control unit 112, or drives the door lock 100 according to the signal from the function expanding device 200.

The multi-purpose interface device 110 is a device that serves to compatibly connect the function expanding device 200 to the door lock 100, and in a broad sense, it includes a pin-slot type connector as illustrated in FIG. 1. If a user intends to add separate additional functions, for example, a camera function, a fingerprint authentication function, a fire detection function, a crime prevention function, a home network interacting function, to the door lock 100 that is presently in use, he/she can expand the functions without having to replace the door lock 100 with a new one merely by connecting the function expanding device 200 having the corresponding functions to the multi-purpose interface device 110.

The multi-purpose interface device control unit 112 is an electronic circuit that includes an algorithm for controlling the function expanding device 200 connected to the multi-purpose interface device 110, a protocol for performing a data communication with the controller unit 104 and the function expanding device 200, an encoder and a decoder each for processing signals for the data communication. The multi-purpose interface device control unit 112 is adapted to identify and control the function expanding device 200 connected to the multi-purpose interface device 110 by use of electric characteristics such as voltage, frequency, timing of signals, mechanical characteristics such as pin arrangement or shape of a connector, and logical characteristics such as a command response, communication protocol, etc.

The driving unit 114 includes one or more relay driving devices, solenoid driving devices, servo motors, mortise locks, etc., all of which are not illustrated in the drawings. The driving unit 114 is adapted to drive loads that include the servo motor and the mortise lock in response to the door locking and unlocking signal output from the controller unit 104, enabling the mortise lock to perform the locking and unlocking function. The term "mortise lock" herein means a linkage assembly of the door lock that mechanically operates to lock/unlock the door.

The power supply unit 116 is composed of an internal power supply using a battery and an external power supply using a commercial power supply. The power supply 116 serves to supply the power for operating the authentication unit 102, controller unit 104, driving unit 114 and function expanding device 200.

Now, the function expanding device 200 that is replaceably connected to the multi-purpose interface device 110 of the door lock 100 will be explained. The function expanding device 200 includes a multi-purpose interface device connection unit 202, a subset module 204 and a multi-purpose interface device signal processing unit 206.

The multi-purpose interface device connection unit 202 is separably connected to the multi-purpose interface device 110 of the door lock 100. The subset module 204 means hardware and/or software for implementing the functions to be expanded, for example, the camera function, fingerprint authentication function, fire detection function, home network interacting function, etc., other than the inherent functions of the door lock 100. The software includes a set of command languages and an operating system program for controlling the hardware as described above.

If the function expanding device 200 is connected to the door lock 100, the functions of the door lock 100 are expanded. For example, if the function expanding device 200 provided with the camera function is connected to the door lock 100, the functions of the door lock 100 are expanded in a manner that it can take a picture of the person who is locking and unlocking the door lock 100 and stores the picture so taken. If the function expanding device 200 provided with the fingerprint authentication function is connected to the door lock 100, the functions of the door lock 100 are expanded in a manner that it can authenticate the user through the fingerprint authentication. Additionally, if the function expanding device 200 provided with the home network function is connected to the door lock 100, the functions of the door lock 100 are expanded in a manner that it can interact with a home network server (not illustrated) and enables the functions of the door lock 100 to be controlled outside the house.

The multi-purpose interface device signal processing unit 206 is a device for processing an electric signal mutually transmitted between the function expanding device 200 and the door lock 100, and includes, for example, an encoder (not illustrated) for encoding the electric signal and a decoder (not illustrated) for decoding the electric signal.

If the controller unit 104 of the door lock 100 transmits the encoded electric signal for controlling the function expanding device 200, the multi-purpose interface device signal processing unit 206 decodes the transmitted electric signal and transfers the decoded signal to the subset module 204. The subset module 204 controls the whole operation of the function expanding device 200 based on the decoded electric signal. By contrast, if the function expanding device 200 transmits the electric signal for controlling the operation of the door lock 100 to the door lock 100, the multi-purpose interface device signal processing unit 206 encodes the transmitted electric signal and transfers the encoded signal to the controller unit 104 of the door lock 100.

Figure 2:
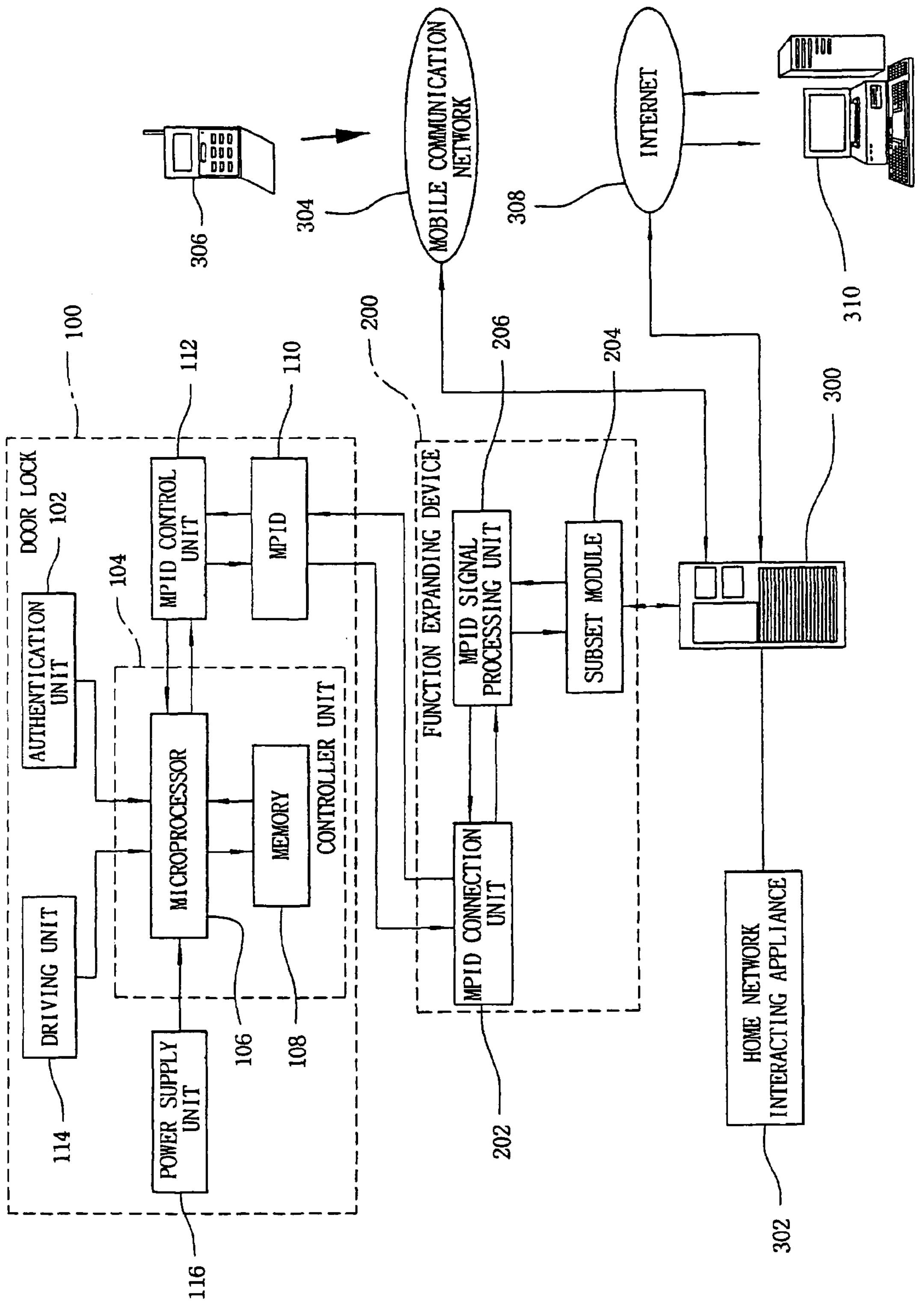
FIG. 2 is a view illustrating the inventive door lock system that is connected to a home network system by a function expanding device.

FIG. 2 is a view illustrating the door lock system in which the door lock 100 is connected to a home network system by the function expanding device 200 according to the present invention.

The door lock system according to the present invention constitutes a part of the home network system. In other words, the home network system includes the door lock 100, the function expanding device 200, a home network server 300, a home network interacting appliance 302, a mobile communication network 304, a mobile communication terminal 306, an Internet 308 and a computer 310.

In the home network system as constructed above, the user can control the home network interacting appliance 302 connected to the home network server 300 through the use of a terminal that includes the separate mobile communication terminal 306 or the computer 310 inside/outside the house. The home network interacting appliance 302 is an appliance interacting with the home network server 300, and may include a gas sensor, a window sensor, a home electronic appliance, and the door lock system according to the present invention.

The general home network system is constructed by using one of the standard technologies of a home radio frequency, Bluetooth, Wi-Fi that are conformable to the 802.11b standard.

In the process of constructing the home network system by use of the above-described standard technology, a compatibility problem may occur. For example, in the case of constructing the home network system using the home network server 300 that supports Wi-Fi and the home network interacting appliance 302 that supports Bluetooth, the home network interacting appliance 302 may not operate under the control of the home network server 300 because the standard technologies that support the home network server 300 and the home network interacting appliance are different from each other. However, according to the door lock system according to the present invention, the compatibility problem can be solved merely by connecting the function expanding device 200 having the standard technologies supported by the home network system to the door lock 100.

The function expanding device 200 connected to the door lock 100 receives the power from the door lock 100, and performs a data communication with the home network server 300 through the multi-purpose interface device signal processing unit 206 of the function expanding device 200. That is, the door lock 100 connected to the function expanding device 200 transmits status information generated from the door lock 100 to the home network server 300 through the multi-purpose interface device signal processing unit 206. For example, the status information that includes a door locking and unlocking time, persons who came in/out through the door, fire alarm generation, etc., is generated by the subset module 204 and then transmitted to the home network server 300.

The home network server 300 is provided with a database (not illustrated) and a communication interface (not illustrated), and connected to the home network interacting appliance 302, the mobile communication network 304 and the Internet 308. The home network server 300 stores the status information of the door lock 100 transmitted from the function expanding device 200 in the database.

The communication interface of the home network server 300 is connected to the mobile communication network 304 and the Internet 308. The user can connect to the home network server 300 by using the mobile communication terminal 306 and the computer 310 from an outside of the house, and after connecting to the home network server 300, he/she can download the status information of the door lock 100 stored in the database. Also, the user can remotely control the operations of various kinds of home network interacting appliances 302 connected to the home network server 300 using the mobile communication terminal 306.

FIG. 3 is a view illustrating a door lock system in which a function expanding device 400 having a camera function is connected to a door lock 420 according to the present invention.

In this door lock system, the door lock 420, which is similar to the door lock 100 as illustrated in FIG. 1, includes a controller unit 422, a multi-purpose interface device control unit 424 and a multi-purpose interface device 426.

Additionally, the function expanding device 400 provided with a camera function, which is similar to the function expanding device 200 as illustrated in FIG. 1, includes a multi-purpose interface device connection unit 402, a multi-purpose interface device signal processing unit 406 and a subset module 404. Also, the subset module 404 is composed of a camera module 410, an I/O (input/output) port 412, a memory 414 and a camera control processor 408. With respect to the same elements as those illustrated in FIG. 1, the detailed explanation thereof will be omitted for the sake of simplicity.

According to the above-described construction, the door lock 420 can take a picture and/or a moving picture of a person who tries to lock/unlock the door lock 420 through the function expanding device 400 provided with the camera function and can store the picture so taken.

The camera control processor 408 is a kind of central processing unit, and controls the camera module 410, the I/O port 412 and the memory 414 by analyzing the electric signal transferred from the multi-purpose interface device signal processing unit 406.

The camera module 410 comprises a CCD (charge coupled device) or CMOS (complementary metal oxide semiconductor) type image pickup device, and takes a still picture and/or a moving picture of an object under the control of the camera control processor 408.

The I/O port 412 comprises a pin-slot type connector, for instance. The function expanding device 400 is connected to the mobile communication terminal (not illustrated), the computer (not illustrated) and the home network server (not illustrated) through the I/O port 412. The user connects to the home network server and downloads the still picture and/or the moving picture stored in the memory 414 by using the mobile communication terminal or the computer.

The memory 414 comprises an EEPROM (electrically erasable programmable read only memory) or flash memory type storage device, and stores the still pictures and moving pictures generated in the camera module 410.

If the function expanding device provided with the camera function is connected to the door lock 420 as described above, the functions of the door lock 420 are expanded in a manner that it can obtain and store the still pictures or the moving pictures of persons who have tried to lock/unlock the door.

If the user brings an electronic key close to the door lock 420 or inputs a secret number in order to attempt the locking and unlocking of the door lock 420, the authentication unit (not illustrated) performs the authentication process with respect to the electronic key or the input secret number. In the process of performing the authentication process, the authentication unit generates and transfers an authentication success signal or an authentication failure signal to the controller unit 422.

The controller unit 422 that has received the authentication success signal or the authentication failure signal generates and transmits an electric signal that includes a drive success signal or a drive failure signal to the driving unit (not illustrated) and the multi-purpose interface device control unit 424. The multi-purpose interface device control unit 424 encodes the electric signals with an encoder, and transfers the encoded electric signal to the multi-purpose interface device connection unit 402 of the function expanding device 400 through the multi-purpose interface device 426 of the door lock 420.

The electric signal transferred from the door lock 420 through the multi-purpose interface device connection unit 402 is transferred to the multi-purpose interface device signal processing unit 406 of the function expanding device 400, and the multi-purpose interface device signal processing unit 406 decodes the corresponding electric signal. The decoded electric signal is transferred to the camera control processor 408, and the camera control processor 408 operates the camera module 410 according to the signal received.

The camera module 410 takes a still picture and/or a moving picture of an object under the control of the camera control processor 408. The still picture and/or moving picture taken by the camera module 410 is transferred to the camera control processor 408, and the camera control processor 408 stores the taken still picture and/or moving picture in the memory 414.

The user can download and confirm the still picture and/or the moving picture stored in the memory 414 by connecting the mobile communication terminal or the computer to the external I/O port 412.

FIG. 4 is a flowchart illustrating the initial process when the function expanding device is connected to the door lock in the door lock system according to the present invention.

The function expanding device 200 is connected to the multi-purpose interface device 110 of the door lock 100 (step S500). The multi-purpose interface device control unit 112 of the door lock 100 identifies and judges whether the function expanding device 200 connected to the multi-purpose interface device 110 is a proper device, and verifies whether the communication protocol provided in the multi-purpose interface device control unit 112 coincides with the communication protocol of the function expanding device 200 (step S502).

If it is judged that the function expanding device 200 is a proper device and the communication protocol of the multi-purpose interface device control unit 112 coincides with the communication protocol of the function expanding device 200 (step S502), the controller unit 104 controls the function expanding device 200 using the communication protocol (step S504). The manner in which the function expanding device 200 is controlled may be changed depending on the kind of the function expanding device 200.

INDUSTRIAL APPLICABILITY

As is apparent from the foregoing description, according to the easy-to-retrofit, electronically controlled door lock system according to the present invention, it becomes possible, as needed, to add new functions, e.g., crime prevention, fingerprint authentication, fire detection, home network interacting, to the door lock in use by retrofitting the door lock with ease and in a cost-effective manner, meaning that the functions of the door lock can be changed or expanded without having to replace the door lock as a whole.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

The invention claimed is:

1. An easy-to-retrofit, electronically controlled door lock system, comprising:

a door lock configured to be mounted to a door for locking and unlocking the door in response to an input signal from a key means, the door lock having predetermined inherent functions; and a function expanding device selected from a plurality of function expanding devices each having additional functions other than the predetermined inherent functions of the door lock and each configured to be removably attached to the door lock at the door;

wherein the door lock configured to be mounted to the door comprises an authentication unit for authenticating the key means of the door lock, a multi-purpose interface device for removably connecting the function expanding device to the door lock, a multi-purpose interface device control unit for identifying and controlling an operation of the function expanding device, a controller unit for controlling the door lock, and a driving unit for causing the door lock to perform the locking and unlocking under the control of the controller unit; and wherein the multi-purpose interface device control unit identifies the function expanding device connected to the multi-purpose interface device by use of electric characteristics including at least one of a voltage, a frequency and a timing of signals, mechanical characteristics of connector pins, and logical characteristics including a command response.

2. The door lock system as recited in claim 1, wherein the multi-purpose interface device control unit includes an algorithm for controlling the function expanding device connected to the multi-purpose interface device, a protocol for performing a data communication with the controller unit and the function expanding device, an encoder and a decoder each for processing signals for the data communication.

3. The door lock system as recited in claim 1, wherein the function expanding device comprises:

a multi-purpose interface device connection unit separably connected to the multi-purpose interface device of the door lock;

a subset module for implementing the additional functions other than the inherent functions of the door lock; and a multi-purpose interface device signal processing unit for processing signals inputted and outputted from the subset module to the multi-purpose interface device.

4. The door lock system as recited in claim 1, wherein the additional functions of the function expanding device include functions of camera, fingerprint authentication, fire monitoring and home network interaction.

5. The door lock system as recited in claim 1, wherein the function expanding device includes a subset module for implementing a camera function, and the subset module comprises a camera module, an input/output port, a memory and a camera control processor.

6. An easy-to-retrofit, electronically controlled door lock system comprising:

an electronic door lock configured to be mounted to a door and operable to unlock the door in response to detection of an authorized key; and a function expanding device selected from a plurality of function expanding devices each configured to be removably connected to the electronic door lock at the door to provide the door lock with enhanced features in addition to locking and unlocking the door;

the door lock comprises:

an authentication unit configured to detect the key;

an interface device configured to removably connect any one of the plurality of function expanding devices to the door lock; and a controller unit configured to control the electronic door lock; and a multi-purpose interface device control unit configured to control the function expanding device, and identify any one of the plurality of function expanding devices removably connected to the interface device by use of electric characteristics including at least one of a voltage, a frequency and a timing of signals, mechanical characteristics of connector pins, and logical characteristics including a command response;

the function expanding device comprises:

a connection unit configured to cooperate with the interface device to connect the function expanding device to the door lock; and a subset module that includes the enhanced features.

7. The door lock system of claim 6, wherein the door lock further comprises a power supply unit configured to supply power to both the door lock and the function expanding device.

8. The door lock system of claim 6, wherein the door lock further comprises a driving unit operable to mechanically lock and unlock the door.

9. The door lock system of claim 6, wherein the subset module includes a camera.

10. The door lock system of claim 6, wherein the subset module includes a fingerprint authentication device.

11. The door lock system of claim 6, wherein the subset module includes a fire detection device.

12. The door lock system of claim 6, wherein the subset module includes a home network connection device.

13. The door lock system of claim 6, wherein the function expanding device includes a signal processing unit configured to decode signals received from the door lock and encode signals transmitted to the door lock.

14. The door lock system of claim 6, wherein the door lock further comprises an interface device control unit, the controller is configured to control the function expanding device through the interface device control unit.

15. An easy-to-retrofit, electronically controlled door lock system comprising:

an electronic door lock configured to be mounted to a door, the door lock including;

an authentication unit configured to read first authentication information from a key means;

a driving unit configured to mechanically lock and unlock the door;

a multi-purpose interface device;

a multi-purpose interface device control unit including an encoder and decoder configured to process data communication signals;

a controller unit that controls the door lock, the controller unit includes a microprocessor and a memory unit, the controller unit is connected to each of the authentication unit, the multi-purpose interface device, the multi-purpose interface device control unit, and the driving unit;

wherein the controller unit determines whether the key means is authorized by comparing the first authentication information of the key means read by the authentication unit with second authentication information stored in the memory unit, the controller unit generates and transmits a driving signal to the driving unit upon determining that the key means is authorized;

a power supply unit connected to the controller unit, the power supply unit includes an internal power supply and an external power supply that are configured to supply power to the authentication unit, the controller unit, and the driving unit;

a function expanding device selected from a plurality of function expanding devices each configured to provide the door lock with enhanced features in addition to locking and unlocking the door, the function expanding device includes:

a multi-purpose interface device connection unit configured to be connected to the multi-purpose interface device of the door lock to connect the door lock to the function expanding device;

a multi-purpose interface device signal processing unit that at least one of decodes signals received from the door lock and encodes signals transmitted to the door lock; and a subset module including at least one of hardware and software, the subset module controls the function expanding device based on signals received from the controller unit and decoded by the multi-purpose interface device signal processing unit;

wherein the multi-purpose interface device is configured to removably connect any one of the plurality of function expanding devices thereto;

wherein the controller unit of the door lock is configured to control operation of any one of the plurality of function expanding devices connected to the multi-purpose interface device through the multi-purpose interface device control unit;

wherein the multi-purpose interface device control unit of the door lock is configured to control and identify any one of the plurality of function expanding devices connected to the multipurpose interface device by use of electric characteristics including at least one of a voltage, a frequency and a timing of signals, mechanical characteristics of connector pins and logical characteristics including a command response, and determine whether a first communication protocol of the multi-purpose interface device control unit coincides with a second communication protocol of the function expanding device connected to the multi-purpose interface device; and wherein the power supply of the door lock supplies power to both the door lock and the function expanding device.

16. The door lock system of claim 15, wherein the subset module includes a camera.

17. The door lock system of claim 15, wherein the subset module includes a home network interface.

18. The door lock system of claim 15, wherein the subset module includes a fire detection device.

19. The door lock system of claim 15, wherein the subset module includes a device for monitoring an environment surrounding the door lock.

* * * * *

US008035478C1

(12) EX PARTE REEXAMINATION CERTIFICATE (10254th)

United States Patent

Lee

(10) Number: US 8,035,478 C1
(45) Certificate Issued: Aug. 11, 2014

(54) EASY-TO-RETROFIT, ELECTRONICALLY CONTROLLED DOOR LOCK SYSTEM

(75) Inventor: Yong-Jong Lee, Seoul (KR)

(73) Assignee: Irevo, Inc., Geumcheon-Gu, Seoul (KR)

Reexamination Request:
No. 90/012,969, Sep. 4, 2013

Reexamination Certificate for:
Patent No.: 8,035,478
Issued: Oct. 11, 2011
Appl. No.: 10/592,846
Filed: Sep. 14, 2006

(21) Appl. No.: 90/012,969

(22) PCT Filed: Mar. 16, 2005

(86) PCT No.: PCT/KR2005/000756
§ 371 (c)(1),
(2), (4) Date: Sep. 14, 2006

(87) PCT Pub. No.: WO2006/001572
PCT Pub. Date: Jan. 5, 2006

(30) Foreign Application Priority Data

Mar. 16, 2004 (KR) ........................ 10-2004 0017568

(51) Int. Cl.
*G07C 9/00* (2006.01)
*G06F 7/00* (2006.01)

(52) U.S. Cl.
USPC ......... 340/5.7; 340/3.1; 340/426.28; 340/5.1; 340/5.2; 340/542; 70/163; 70/271

(58) Field of Classification Search
None
See application file for complete search history.

(56) References Cited

To view the complete listing of prior art documents cited during the proceeding for Reexamination Control Number 90/012,969, please refer to the USPTO's public Patent Application Information Retrieval (PAIR) system under the Display References tab.

*Primary Examiner* — Sam Rimell

(57) ABSTRACT

Disclosed is an easy-to-retrofit, electronically controlled door lock system designed to change or expand functions of a door lock without having to replace the door lock as a whole. The door lock system includes a door lock 100 for locking and unlocking a door in response to an input signal from a key means, the door lock having predetermined inherent functions, and a function expanding device 200 having additional functions other than the predetermined inherent functions of the door lock, the function expanding device being replaceably attached to the door lock.

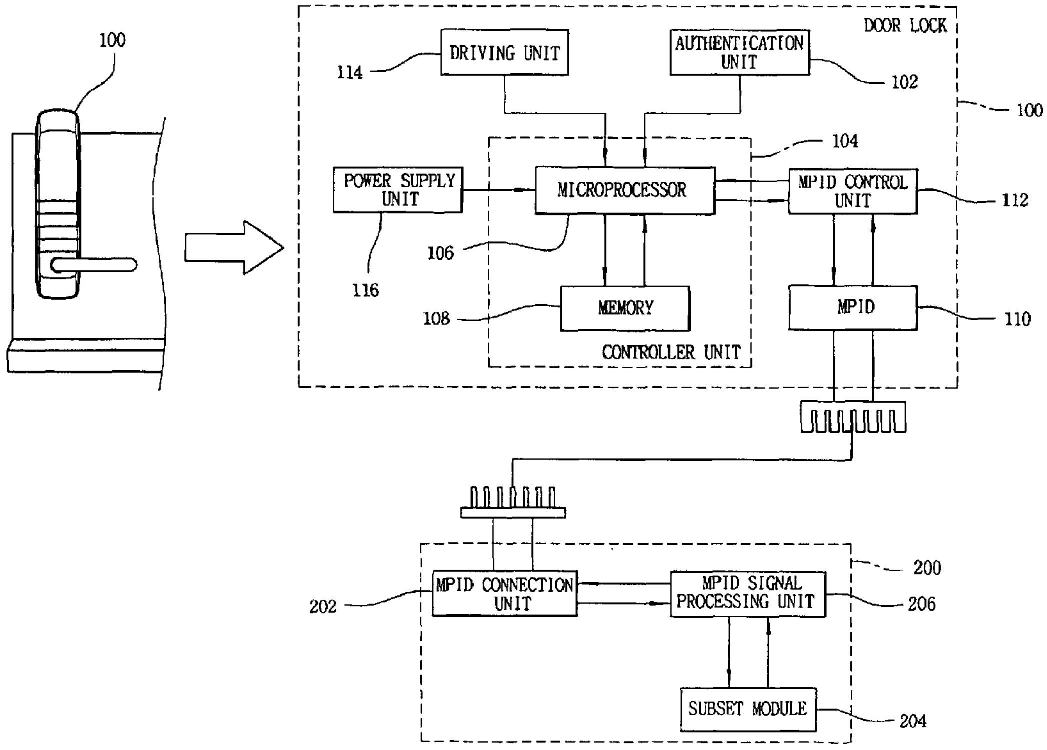

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 15 is confirmed.

Claims 1 and 6 are determined to be patentable as amended.

Claims 2 and 3, dependent on an amended claim, are determined to be patentable.

Claims 4-5, 7-14 and 16-19 were not reexamined.

1. An easy-to-retrofit, electronically controlled door lock system, comprising:

a door lock configured to be mounted to a door for locking and unlocking the door in response to an input signal from a key means, the door lock having predetermined inherent functions; and a function expanding device selected from a plurality of function expanding devices each having additional functions other than the predetermined inherent functions of the door lock and each configured to be removably attached to the door lock at the door;

wherein the door lock configured to be mounted to the door comprises an authentication unit for authenticating the key means of the door lock, a multi-purpose interface device for removably connecting the function expanding device to the door lock, a multi-purpose interface device control unit for identifying and controlling an operation of the function expanding device, a controller unit for controlling the door lock, and a driving unit for causing the door lock to perform the locking and unlocking under the control of the controller unit; and wherein the multi-purpose interface device control unit identifies the function expanding device connected to the multi-purpose interface device by use of electric characteristics including at least one of a voltage, a frequency and a timing of signals, mechanical characteristics of connector pins, and logical characteristics including a command response*, and the multi-purpose interface device control unit determines that its communication protocol and a function expanding device communication protocol coincide*.

6. An easy-to-retrofit, electronically controlled door lock system comprising:

an electronic door lock configured to be mounted to a door and operable to unlock the door in response to detection of an authorized key; and a function expanding device selected from a plurality of function expanding devices each configured to be removably connected to the electronic door lock at the door to provide the door lock with enhanced features in addition to locking and unlocking the door;

the door lock comprises:

an authentication unit configured to detect the key;

an interface device configured to removably connect any one of the plurality of function expanding devices to the door lock; and a controller unit configured to control the electronic door lock; and a multi-purpose interface device control unit configured to control the function expanding device, and identify any one of the plurality of function expanding devices removably connected to the interface device by use of electric characteristics including at least one of a voltage, a frequency and a timing of signals, mechanical characteristics of connector pins, and logical characteristics including a command response*, and to determine that its communication protocol and a function expanding device communication protocol coincide*;

the function expanding device comprises:

a connection unit configured to cooperate with the interface device to connect the function expanding device to the door lock; and a subset module that includes the enhanced features.

* * * * *